Nov. 30, 1954 R. A. ZUERCHER 2,695,590
FOOD COATING AND HANDLING APPARATUS
Filed Jan. 13, 1951 3 Sheets-Sheet 3
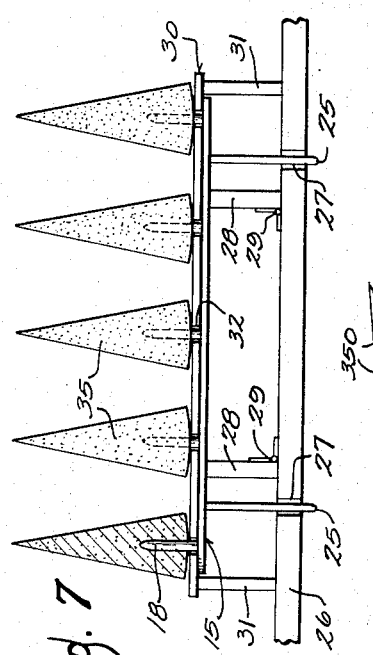
Fig. 7
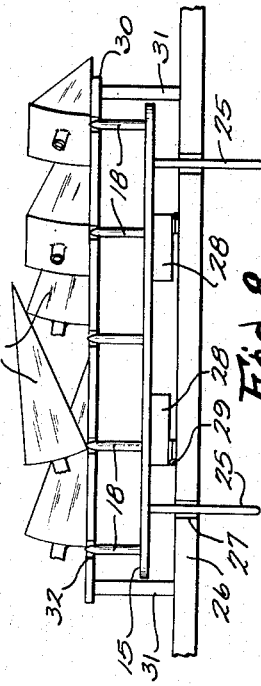
Fig. 8
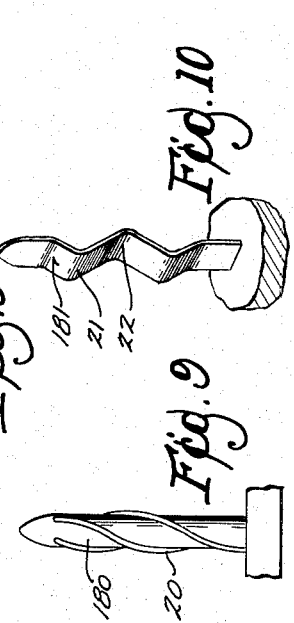
Fig. 9
Fig. 10
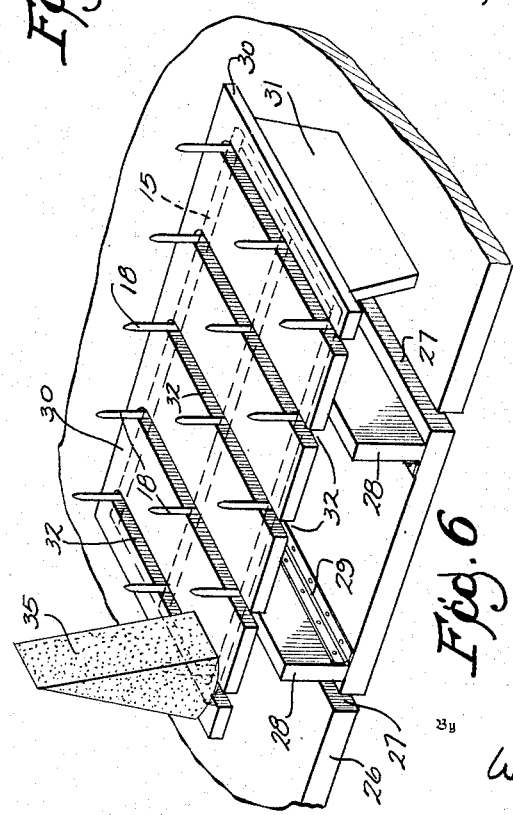
Fig. 6
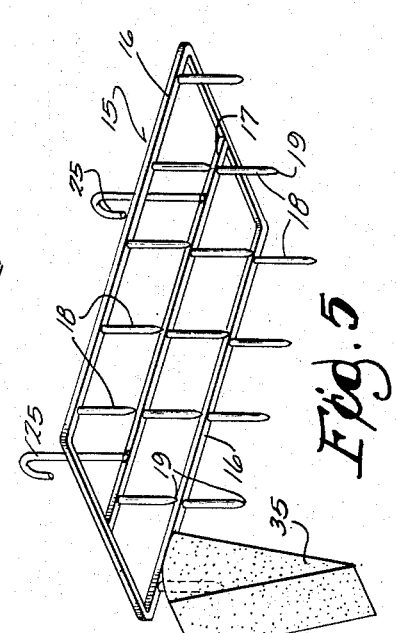
Fig. 5
Inventor
ROBERT A. ZUERCHER
By Wheeler, Wheeler & Wheeler
Attorneys United States Patent Office 2,695,590
Patented Nov. 30, 1954

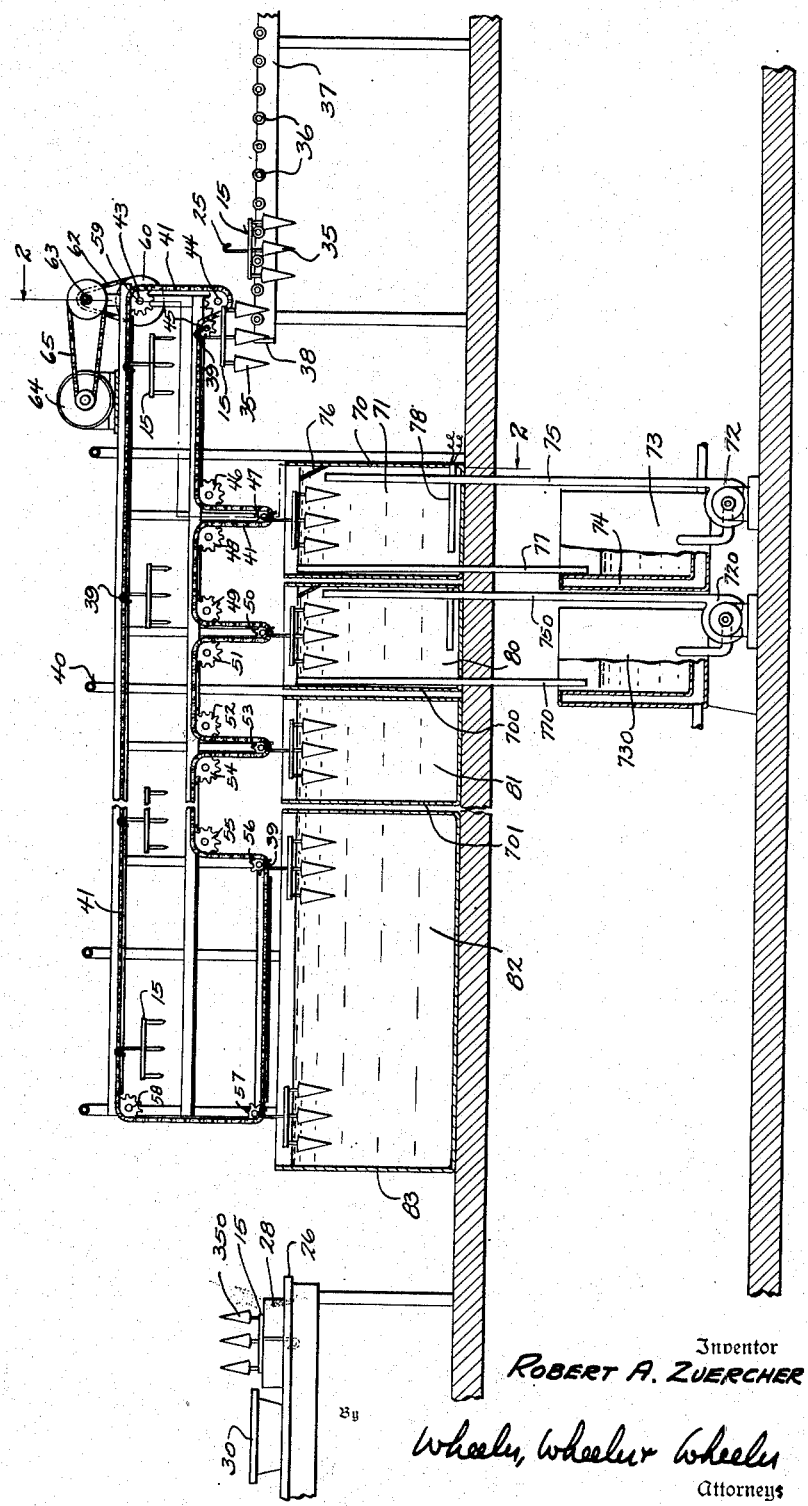

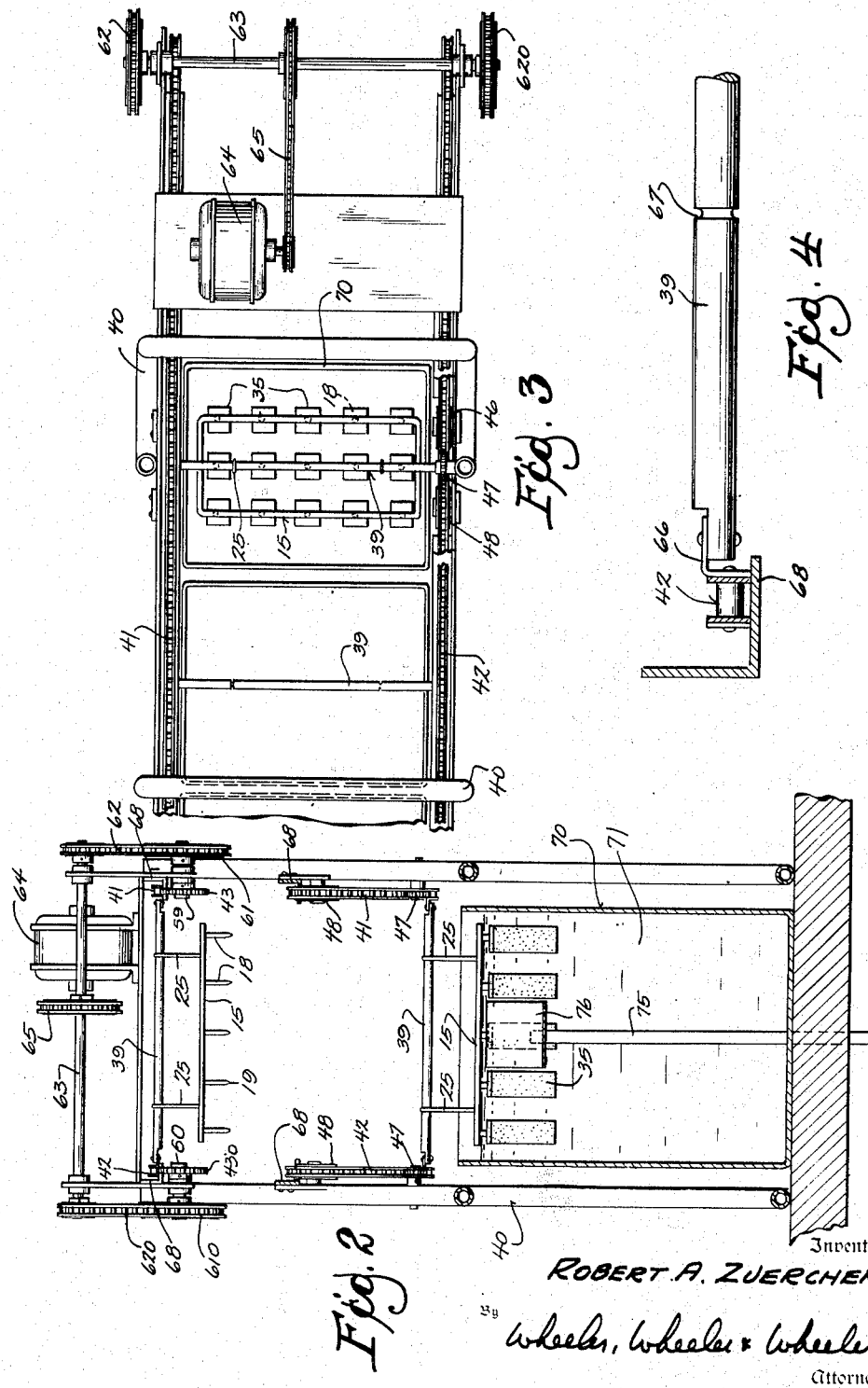

2,695,590
FOOD COATING AND HANDLING APPARATUS

Robert A. Zuercher, Park Ridge, Ill.

Application January 13, 1951, Serial No. 205,849

4 Claims. (Cl. 118—29)

This invention relates to food coating and handling apparatus. As in the case of my companion application entitled "A Food Package and Method for the Production Thereof," Serial No. 205,850, filed January 13, 1951, I have chosen to illustrate the use of the apparatus of the present invention for the handling and wax coating of cheese; but the mechanisms disclosed are not limited to this particular usage.

The invention contemplates an arrangement for facilitating the loading of articles on to carriers having prongs upon which such articles are impaled, and having hooks by which the carriers are detachably suspended from a conveyor system with grooved cross bars from which the hooks are suspended and which locate the carriers against the lateral displacement and lower successive carrier loads of articles into successive baths. One or more baths may comprise coating baths and one or more may comprise cooling baths. The carriers and the means by which they are loaded on to the conveyor and the structure of the conveyor itself are significant parts of the invention.

The conveyor frame has a structure and mode of operation which not only protects the workers but promotes cleanliness and sanitation because all chain parts and the like are outside of the dipping area, thus precluding contamination of food products being dipped or of the coating or cooling baths into which the dipping is done.

The invention is also concerned with the recirculation of the bath stock so that the level thereof may be maintained constant, notwithstanding the continuous removal of portions thereof which are coated on to the workpieces impaled on the carrier pegs. In this connection, the circulation of the bath stock also involves movement thereof in the direction in which the articles move during coating, and at substantially the same speed, so that the coating will be uniform on all surfaces, notwithstanding the conveyor-induced movement of the articles coated.

The invention is also concerned with the means used in loading and unloading the workpieces when they are placed on or removed from the carrier pegs.

In the drawings:

Fig. 1 is a view in longitudinal section through coating apparatus incorporating features of the invention.

Fig. 2 is an enlarged detail view taken in section on the line 2—2 of Fig. 1.

Fig. 3 is a view in plan of the portion of the apparatus shown in Fig. 2.

Fig. 4 is a further enlarged detail view of one of the carrier supporting rods with which the conveyor mechanism of Figs. 1 to 3 is equipped.

Fig. 5 is an enlarged view in bottom perspective of the carrier employed for the purposes of the present invention.

Fig. 6 is a view in perspective showing the mechanism used in the loading of workpieces on to the carrier shown in Fig. 5.

Fig. 7 is a view in front elevation of the device shown in Fig. 6.

Fig. 8 is a view similar to Fig. 7 showing how the mechanism is used for unloading the carrier.

Figs. 9 and 10 are views respectively in elevation and perspective showing modified forms of carrier pegs.

The carrier 15 shown in the drawings as a preferred, skeletonized construction, comprises a generally rectangular frame bar 16 spanned longitudinally by a center bar 17. The center bar and the parallel sides of the frame bar support parallel rows of pegs 18, in any desired number. These pegs may be pieces of cylindrical rod stock, sharpened at their impaling ends 19, or they may be provided with helical ribs 20 of high pitch, as shown in the case of the bar 180 in Fig. 9. Or the pegs may be made, as indicated at 181 in Fig. 10, of flat strip metal with convolutions at 21 and 22.

However the carrier is made, and whatever the type of impaling peg it employs, each carrier is desirably provided on its top surface with supporting hooks 25.

For loading and unloading carriers, special devices are employed as shown in Figs. 6, 7, and 8. The table 26 has slots at 27 to receive the supporting hooks 25 of the inverted carrier 15. The carrier rests upon upright rails 28 which, for unloading purposes, are desirably hinged at 29 to the table. For loading purposes, it is immaterial whether or not the rails 28 are fixed.

Spaced above the rails 28 for a distance sufficient to provide clearance for the sliding insertion and removal of the carrier 15 is a pallet 30 which may have legs 31 supporting it directly from the table 26. This pallet has slots 32 so positioned as to register with, and to receive, the upwardly projecting impaling pegs 18 of the inverted carrier.

With the parts in the position shown in Figs. 6 and 7, the workpieces 35 (which may, by way of exemplifying the invention, comprise wedges of cheese) may be impaled manually on the projecting pegs 18 to an extent of penetration accurately defined by the surface of the pallet 30.

When the desired load of workpieces 35 has been impaled on the pegs 18, the carrier is slid outwardly on rails 28, the pegs or prongs 18 being thereby withdrawn from slots 32. The carrier is then inverted and it may be placed on the laterally spaced rollers 36 of conveyor 37, as shown in Fig. 1, and advanced with its ends supported on such rollers, until the carrier strikes the stop 38. At this point, its upwardly projected hooks 25 will be accurately located to be engaged and picked up by the cross bar 39 of the power operated conveyor presently to be described.

Essentially the same apparatus used in loading the carriers is used for unloading them as shown in Fig. 8. Supported on the rails 28, the carrier and its load of coated workpieces 350 is slid beneath pallet 30, the slots 32 thereof accommodating the impaling pegs 18. When the rails 28 are thereupon collapsed, the workpieces 350 rest on the pallet; and a downward pull on the hooks 25 will withdraw the carrier from the coated workpieces, allowing these to fall upon the pallet, as shown in Fig. 8.

The particular nature of the carrier pegs will depend somewhat on the character of the work to be impaled thereon. For relatively light weight blocks of cheese, impaling pegs with smooth cylindrical surfaces may be used, as shown in Figs. 5 to 8. If the workpieces are so heavy, or the friction thereof on the impaling pegs so slight, that the workpieces tend to slip off, the pegs may be made with roughened or irregular surfaces such as those shown in Figs. 9 and 10, these being merely suggestive of the many possibilities.

The mechanically powered conveyor system and associated coating and cooling bath will now be described.

A suitable frame 40 has, at its opposite sides and in laterally spaced planes, sprockets for the support of the parallel conveyor chains 41, 42. These are desirably so widely spaced as to be outside of the area in which the coating and cooling baths are located. The disposition of chain 41 and the sprockets over which it operates as shown in Fig. 1 and Fig. 2 is typical of both chains. Conveyor chain 41 passes from the driving sprocket 43 downwardly to a sprocket 44 and thence slightly upwardly to a sprocket 45.

The chain then progresses substantially horizontally to a sprocket 46, thence downwardly to a sprocket 47, and upwardly to a sprocket 48. From sprocket 48, the chain goes substantially horizontally to sprocket 49, thence downwardly about sprocket 50 and upwardly about sprocket 51. From sprocket 51 the chain passes substantially horizontally to sprocket 52, thence downwardly and about sprocket 53, and upwardly and about sprocket 54. From sprocket 54 the chain passes substantially horizontally to sprocket 55 and about this sprocket and downwardly to sprocket 56. Passing beneath sprocket 56 the chain extends substantially horizontally to pass beneath sprocket 57 about which it is guided to pass upwardly and over sprocket 58. Thence the chain may continue in one single run back to the drive sprocket 43.

Each of these sprockets is mounted on a short stud shaft so that the space between chains 41 and 42 in traversing their respectively aligned sprockets is entirely clear except for the cross bars 39 from which the workpiece carriers 15 are suspended. It will be understood that chain 42 has supporting sprockets in substantial axial alignment with the sprockets about which chain 41 is trained. With the exception of the driving sprocket 43 and the corresponding opposite driving sprocket 430 for chain 42, all of the sprockets idle upon their respective mounting stud shafts. Sprockets 43 and 430 are carried by power driven shafts 59 and 60 which carry sprockets 61 and 610 externally of the machine frame, which are driven by chains 62 and 620 from the jack shaft 63 on top of the machine. The jack shaft may conveniently be driven from motor 64 by chain 65.

Individual links of the respective conveyor chains 41 and 42 are provided, at suitable intervals along the chains, with angle brackets 66 which support the cross bars 39. These cross bars are desirably provided at suitable spaces with annular grooves 67 engaged by the respective hooks 25. The interlocking engagement of the carrier hooks with the grooves of the cross bars precludes lateral displacement of the carriers and assures that each load of workpieces will move properly through the selected portions of the baths, and will be kept centered between the conveyor chains.

Where the bars 39 carry the weight of the carriers, the horizontal runs of the respective chains subject to such weight are desirably supported and guided on tracks 68 in the manner shown in Fig. 4. This prevents the chains from sagging and is particularly desirable to control the depth of immersion of the workpieces and pegs in a coating bath or the like, the carrier proper being ordinarily precluded from such immersion and held by the supporting track at precisely the desired level respecting the surface of the bath. The conveyor frame as a whole, and the tracks 68 in particular, enclose the chains and moving parts of the conveyor apparatus so as to minimize the possibility of injury to employees working with the machine.

The purpose of passing the respective chains downwardly about the sprockets 47, 50, 53, 56, and 57, shown in Fig. 1, is to immerse in successive coating or cooling baths the workpieces mounted on successive carriers being advanced by the chains.

A container 70 is positioned to receive the workpieces impaled on the pegs of carrier 15 when such carrier is lowered by the movement of the chain downwardly from sprocket 46 and beneath sprocket 47 and upwardly about sprocket 48. In a commercial operation exemplifying the invention, this bath comprises a molten waxy composition, which is described in more detail in the companion application above referred to. The bath 71 is maintained at a constant level in receptacle 70 by means of motor driven pump 72 which withdraws stock from a reservoir 73, which is steam jacketed at 74. The delivery pipe 75 from the pump desirably terminates below the level of bath 71 and a deflecting baffle 76 assures proper circulation of the material. The circulation is desirably in the direction of movement of the workpieces immersed in the bath and is correlated, as nearly as possible, with the rate of movement of the workpieces with the carriers. Thus relative movement between the respective workpieces and the bath is minimized to avoid uneven deposits of coating material such as might be occasioned if a substantial degree of relative movement occurred.

From the surface of the bath 71, an overflow pipe 77 returns to the reservoir 73 and is determinative of the level of the coating compound in bath 71, the pump being maintained in operation at a rate such as to assure constant recirculation of the coating material.

As shown, the level of the bath 71 is such that the carrier 15 does not enter the bath but the impaled workpieces 35 are completely immersed therein. For the purposes of the operation selected to exemplify the invention, only a momentary immersion in this particular bath is required, and therefore the chain merely passes about a single sprocket at 47. In instances requiring a longer period of immersion, a second set of sprockets for the respective chains would be employed as hereinafter described. While any desired means may be employed for controlling temperatures, this constituting no feature of the present invention, I have shown, as a supplement to the steam jacket 74, a heating element 78 in the bottom of tank 70 which is subject to the control of a thermostat (not shown). As explained in my companion application above identified, the waxy composition used in coating cheese is maintained, in actual parctice, at 175° F.

The second bath 80 may comprise the same or a different waxy coating where the object of the system is to coat cheese in accordance with the teaching of my said companion application. The bath 80 is contained in a receptacle 700 supplied with coating material from a jacketed reservoir 730 by means of a pump 720 and supply pipe 750 and circulating return pipe 770, the entire arrangement being identical in every respect with that of the first bath.

The third bath 81 may comprise ordinary water where the invention of the said companion application is being practiced. Since the amount of water which will be carried away by the immersed workpieces is relatively minute, no special means of replenishing the third bath 81 in container 701 is disclosed, it being understood that any suitable means for maintaining the level therein may be used, if required.

The fourth bath 82 is comprised in an elongated container 83 in order that the period of immersion may be prolonged by passing the chain horizontally between the sprockets 56 and 57 during such inmmersion. This demonstrates how the period of immersion may be varied in each of the other baths, if required.

When a given carrier 15 has passed through the device and successively entered all of the several baths 70, 80, 81, and 82, it moves upwardly from sprocket 57 toward sprocket 58; and at some convenient point in the course of its upward movement, an operator will unhook the carrier from its supporting bar, invert it on the upstanding rails 28 shown in Fig. 1, slide the pallet 30 above the carrier and beneath the objects 350, and will thereupon hingedly lower the rails 28 and pull downwardly upon the carrier to strip the impaled objects from the pegs, leaving them on the pallet 30 as already described. The operator will then re-engage the hooks of the carrier 15 with one of the cross bars 39 of the conveyor for return across the top of the conveyor system to the receiving end of the machine, wherein the operator will unhook the carrier and reload it in the manner shown in Fig. 6 and above described, for a new cycle of operation. Each loaded carrier engaged with stop 38 is automatically picked up by the conveyor system and passed through the series of baths.

I claim:

1. The combination with a carrier having a frame, article-impaling peg means depending from said frame and hook means projecting upwardly from said frame, of a temporary support for the carrier frame, said support having openings through which the pegs extend in frame supported position, a pair of laterally spaced endless conveyors, guide means about which the respective conveyors pass upwardly at opposite sides of the temporary carrier support, and a cross bar connected at its ends with the respective conveyors and adapted in the course of such upward conveyor movement to engage said hook means to lift the carrier from said support and said pegs through said openings.

2. An article handling device comprising the combination with a carrier comprising an open frame having laterally spaced bars and pegs arranged in rows along said bars, said pegs projecting downwardly from the plane of said frame bars, and hooks connected with a center bar to be disposed at the center of said frame and projecting upwardly from the plane of said bars, of a conveyor comprising laterally spaced chains and transversely extending bars connected at their ends with respective chains, a carrier frame support having means spaced to receive said downwardly projecting pegs therebetween, said means supporting said carrier by the bars thereof with said carrier hooks projecting above the level of said support means, said conveyor chains having upper and lower guides about which said conveyors extend downwardly into proximity with the carrier support whereby said bars will engage said carrier hooks in the course of conveyor movement and thence upwardly to lift said carrier from the support and said pegs upwardly between said support means.

3. The device of claim 2 in further combination with a tank containing coating material beyond said carrier support, said conveyor having a substantially horizontal run above said tank, said conveyors having upper and lower guides for said tank about which said conveyors extend downwardly from the general direction of said runs and thence upwardly to resume movement in said general direction whereby said carrier pegs may be dipped into the coating material in said tank, the level of said coating material being below the lowermost position of the carrier frame bars as it travels about said lower guide whereby only the pegs are dipped.

4. The device of claim 3 in which said tank is provided with means for circulating coating matter therein, said means comprising an overflow pipe disposed at the level of the top of the coating and a supply pipe, said tank being provided with a baffle inclined in the direction of conveyor movement whereby said supply pipe will discharge coating material against said baffle to circulate said coating material in the same direction as conveyor travel.

References Cited in the file of this patent

UNITED STATES PATENTS

| Number | Name | Date |
|---|---|---|
| 762,978 | Baessler | June 21, 1904 |
| 994,524 | Kohlhepp | June 6, 1911 |
| 995,798 | McCullough | June 20, 1911 |
| 1,226,252 | Reese | May 15, 1917 |
| 1,304,309 | Green | May 20, 1919 |
| 1,540,021 | Knight | June 2, 1925 |
| 1,545,114 | Alvey | July 7, 1925 |
| 1,550,679 | Dean et al. | Aug. 25, 1925 |
| 1,943,450 | Molyneaux | Jan. 16, 1934 |
| 2,127,180 | Mandell | Aug. 16, 1938 |
| 2,311,709 | Taylor | Feb. 23, 1943 |
| 2,417,920 | Flink | Mar. 25, 1947 |
| 2,488,535 | Hamburg | Nov. 22, 1949 |